Patented Apr. 30, 1940

2,199,364

UNITED STATES PATENT OFFICE 2,199,364

TREATMENT OF GLYCERIDE OILS

Sidney Musher, New York, N. Y., assignor to Musher Foundation Incorporated, New York, N. Y., a corporation of New York No Drawing. Application June 30, 1939, Serial No. 282,079

7 Claims. (Cl. 99—163)

This invention relates to the preservation of glyceride oils against the development of rancidity and to the development in those oils of desirable flavors and odors.

The large proportion of glyceride oils that are produced and are commercially available are substantially odorless and tasteless having been subjected to a series of refining treatments including causticizing, bleaching and high temperature deodorization so that at the conclusion of such refining treatments, they have no odor or taste characteristics to set apart one type of oil from another.

In addition, the oils that have been subjected to such refining treatment are materially reduced in keeping quality so that they are readily subject to rancidity and to the development of off odors and tastes.

In the case of those glyceride oils that are employed in the manufacture of soap, the use of the highly refined oils results in a soap that has substantially bland characteristics and which requires the addition of essential oils in order to give the finished soap a particularly pleasing odor.

In accordance with the present invention, olives are utilized for infusion in glyceride oils and it is desirable to prepare the olive flesh so that it will become a better base for infusion purposes and so that no undesirable flavors or odors will be transmitted into the glyceride oil with which said olives are infused.

Moreover, it is desirable to process the olive material in such a way that the odor and flavor characteristics may be transmitted into the glyceride oil by the infusion process to give unusual flavoring and odorous characteristics to the infused oil which characteristics differ substantially from the flavor and odor of ordinary expressed olive oil and which flavor and odor of the infused oil are much more pleasing and desirable than the characteristics flavor and odor of ordinary olive oil as obtained by the usual commercial procedure.

In preparing the olives for infusion, the olives are picked desirably when they are fully ripe and before any fermentation has set in. The olives may be in their slightly pre-ripe condition, but this is generally considered undesirable and it is preferable for the olives to be substantially in ripe form.

Immediately after the olives have been picked, they should desirably be packed with from 15% to 100% and preferably about 50% of their total weight of common salt by alternating layers of salt and olives. At regular intervals ranging from one to three days, the brine produced is poured off and the salting allowed to continue until the total moisture content of the olives is 30% or less and preferably under 25%. This will require from about 15 to 35 days and the olives will contain from about 5% to 10% of salt.

This dehydration is highly desirable and the salting down treatment appears definitely to enhance the value of the olive for the subsequent infusion process.

The salted olives may be further dried from 30% moisture to under 20% moisture. For example, the salted olives may be placed in a revolving drum and dried preferably under reduced pressure. Where desired, the drying may take place at atmospheric pressure and it has even been observed that where the olives are dried by allowing a stream of hot air to flow through them, the pro-vitamin A or carotene content of the olive is subsequently retained to be passed on to the glyceride oil by this infusion process.

Where the olives are dried at atmospheric pressure, the olives are placed into a revolving drum containing paddles and, while the drum is revolving, a stream of heated air having a temperature of between 1000° F. and 1600° F. enters one end of the cylinder and passes out the other end of the cylinder at a temperature of about 230° F. to 275° F. When the olives have reached the desired point of dryness of under 20% moisture, they are removed from such chamber.

Another method that may be utilized for the drying of the olives is to expose them in open trays and in thin layers to the direct heat of the sun provided sufficient sunshine is available for the olives to be further dried.

It may in some cases be desirable to immerse the olives immediately after picking and before the brining or salting in a 1% to 2% soda lye solution for from a few minutes to several hours and then to wash the olives in a water several times to remove the lye from them. As a result of the lye treatment, some of the bitter principles of the olive will also be removed leaving an olive that will impart to the glyceride oil by this infusion process a distinctive flavor and odor.

The olives may, where desired, be immersed into a glyceride oil such as into olive oil or more preferably into a refined glyceride oil such as refined corn oil, refined cottonseed oil, refined peanut oil, refined sesame oil, etc., in order to soften the tissues and fleshy portions of the olive.

The immersion of the olives into the oil should take place after the olives have been salted and dehydrated and the olives may be allowed to remain soaking in the oil for a short period of about fifteen minutes to forty-eight hours, and then removed from such oil bath.

Where desired, the olives when freshly picked or after salting, may be subjected to a depulping or depitting operation, whereby their pits are removed. This is accomplished either by hand or machine operation, the pits being utilized for grinding and for use in cattle or other animal feed or for additional infusion purposes. In accordance with this invention, however, it is most preferable to use the entire olive, although the depitted or depulped olive may also be employed.

The salted, dehydrated olive containing under 30% and desirably under 20% of total moisture is then macerated and ground to a fine paste. This is best accomplished by first adding the olive to a grinding machine which pulverizes the pits and also breaks into the fleshy portion. Where the pits are previously removed, the preliminary grinding is not required.

The olives are then subjected to a stone or iron rolling or colloid mill treatment. For example, they may be allowed to pass between stone rollers, the upper roll operating at a different speed than the lower roll in order to finely mill and divide the olive into a paste form. Desirably the olives are subjected to a colloid mill treatment whereby the fine paste is produced.

The paste should be so completely ground that when rubbed between the fingers, the individual particles of the olive can no longer be felt but will be perfectly smooth to the touch.

Where desired, there may be added to the olive before or during the final operation of producing the paste a small quantity, preferably less than 50% against the weight of the olive, of an added glyceride oil and preferably of the oil with which the olive paste is subsequently to be used. For example, if the olive paste is to be employed with refined deodorized corn oil, then the refined deodorized corn oil may be added to the colloid mill at the time the olive pieces are added, on the basis of using 50% of added corn oil against the total weight of the olives and the mixture then put through the colloid mill so that a thinner, more free flowing paste is obtained.

During this macerating or grinding process, the temperature should desirably not exceed 212° F. in order to avoid any burning or scorching of the olives. Where the olive paste is insufficiently dried, it may be further subjected to a drying operation by exposing to a draft of heated air while kept in agitation or by heating under reduced pressure. The olive paste is then ready for addition to and infusion in the glyceride oil.

Among the glyceride oils that may be employed for infusion with the olives thus prepared are included particularly any of the refined oils such as refined cottonseed, soya bean, sesame, peanut, olive, corn, cocoanut, palm, palm kernel, linseed, sunflower seed, etc. oils. By a refined oil is meant an oil which has been subjected to the usual refining processes that may include causticizing, bleaching, winterizing and high temperature deodorization, and such oil being substantially tasteless and odorless and in the normal condition in which it is commonly available on the market for general use.

Other oils that may similarly be treated are the oils that are employed for industrial purposes such as in the manufacture of soap, for textiles, for sulfonation, and in the leather industry such as neat's foot oil, crude cocoanut oil, menhaden oil, cod oil, etc., and also the medicinal oils, such as the fish and fish liver oils including cod liver, halibut liver, tuna fish liver, mackerel, herring, salmon, etc. oils.

The oils that are processed in accordance with this invention are desirably of the refined or semi-refined types, but crude oils may also be treated. It is most desirable to utilize the substantially refined oils because the benefits that are derived from this invention are of particular importance in the treatment of the refined oils.

Animal oils and fats that may also be treated include lard, oleo oil, tallow, neat's foot oil, etc., and there may also be treated the hydrogenated fats and shortenings such as those obtained by the usual hydrogenation process including hydrogenated cottonseed oil, hydrogenated corn oil, hydrogenated sunflower seed oil, etc.

In the treatment of these glyceride oils, the olive paste prepared as indicated above is added to and thoroughly dispersed in the glyceride oil in an amount of less than 20% and desirably in an amount of 7% or less. As little as 0.5% up to 5% will give highly desirable results.

The olive paste is mixed thoroughly throughout the body of the oil and preferably while the oil is at a slightly elevated temperature or such as at about 160° F. to 200° F. and desirably at about 175° F. The oil containing the olive paste is agitated for a short period of time ranging from one minute to several hours and it is then the undesired solids of the olive are removed by centrifuging, filtration or similar means.

It is particularly desirable where possible for the oil containing the olive paste thoroughly dispersed therein to be put through a colloid mill in order to completely contact the individual particles of the olive with the glyceride oil. In other words, the oil containing the olive paste is well agitated at the slightly elevated temperature and passed through the colloid mill. Under these conditions the oil does not subsequently require any further time period for the olive paste to remain in contact with that oil but the oil may then be subjected to immediate filtration, centrifuging or other treatment to remove the undesired solids.

It is not desirable for the olive paste to be treated in a large amount with a glyceride oil such as when using, for example, 50% of olive paste and 50% of refined glyceride oil and with the olive paste solids then filtered from the oil and that oil to be mixed with other glyceride oils. When this procedure is followed, the full antioxidant and desirable flavoring and odorous constituents of the olive are not developed in the glyceride oil undergoing treatment. The most desirable procedure is for the olives to be added to and mixed in the glyceride oil in an amount of less than about 20% and desirably less than about 7% and then to filter out of the entire body of the oil the undissolved olive solids.

When, for example, a refined deodorized cottonseed oil or corn oil is treated in accordance with this invention with say 5% of an olive paste prepared in the manner indicated above, the mixture of the olive paste and the oil having been carried out at about 175° F. for 15 minutes and then with the undesired solids removed by filtration, the resultant oil has entirely new characteristics from a standpoint of odor and taste and is even superior to a fine, natural olive oil. The infused oil is, moreover, worth at least two or three times as much as the refined deodorized cottonseed or corn oil that was used for infusion even though the cost of the infusion treatment is negligible.

In addition, the refined deodorized cottonseed or corn oil is materially improved in keeping quality and it is frequently possible to extend the life of a glyceride oil by three or four times when utilizing this process.

Where this process is applied to glyceride oils that are subsequently employed in the manufacture of soap, the resultant soap takes on new odoriferous characteristics somewhat similar to fine olive oil and it is possible hereby to utilize glyceride oils other than olive oil in order to develop similar odoriferous characteristics in soap which would normally be developed only by the use of pure olive oil.

Insofar as salad and table edible oils are concerned, this process is desirable applied to any of the refined deodorized vegetable and animal oils and fats such as to refined deodorized cottonseed oil, corn oil, olive oil, etc., although it may also less preferably be applied to the crude oils.

A virgin olive oil may be desired for use with a more concentrated and different olive flavor. This could not be obtained by any mere mixing process because there is only a certain amount of flavor that can be removed when the olive is normally pressed. In accordance with this invention, however, the macerated olive paste may be utilized in the treatment of a natural olive oil in order to develop much stronger and more concentrated and different odor and flavor characteristics in that olive oil and also to very materially improve its keeping quality.

In addition to the antioxidant, flavor and odor characteristics imparted to the glyceride oils which are treated in accordance with this invention, the pro-vitamin A content of the oils may be enhanced because during the normal expression of the olive to produce olive oil, only a small proportion of the total carotene or pro-vitamin A content is removed from the olive whereby in accordance with this process substantially all of the pro-vitamin A content of the olive is removed and passed on to the glyceride oil with which said olive paste is infused.

The high moisture containing olive in its original and natural condition is not capable of treatment in accordance with this invention. Where the original undried olive is ground to a paste and where that paste is then added to and mixed in the glyceride oil, said glyceride oil does not take on the desirable flavor and aromatic and other characteristics of the olive which are obtained when the olive is first processed in the manner indicated above by first salting and drying and then infusing the substantially low moisture paste in the oil.

The residue obtained following the filtration or centrifuging of the glyceride oil from the olive paste, may desirably be utilized for hydraulic or expeller expression in order to remove substantially all of the oil still remaining therein. The residue may then be ground to a flour and employed for cattle food or other animal food purposes, or because of its highly acceptable nature, may be utilized in special foods, as for confectionery purposes, for food flavoring purposes, for alcoholic extraction to remove cathartic or laxative principles which alcoholic extract may be used in medicinal emulsions as in petroleum or mineral oil emulsions, for direct addition to mineral or glyceride oils, etc.

The residue of olive solids that is obtained following the first infusion with an oil may be employed a second time although it is one of the features of this treatment that when the olive paste is infused in accordance with this invention, substantially all of the flavor, odor and other properties are removed therefrom so that very little if anything is left behind to be available for a second infusing operation.

Where increased antioxidant action is required, the glyceride oil containing the olive macerated paste is subjected to an elevated temperature of from 200° F. to 300° F. and even as high as 400° F. to 450° F. whereby much more marked antioxidant properties are developed. There is no explanation as to why the antioxidant action becomes so much more pronounced at the elevated temperature whereby the higher the heat treatment, the greater the antioxidant effect obtained.

In accordance with this invention, however, the most desirable temperature from the standpoint of retaining the full characteristics of the olive and imparting the full desirable characteristics to a glyceride oil in a way in which it cannot be imparted in any other manner, is to heat the olive paste and the glyceride oil to a temperature of no more than about 175° F. or ranging from 150° F. to 200° F.

As an indication of the effectiveness of the salted and dehydrated olive paste in retarding the development of rancidity in glyceride oils, the following experiment was conducted:

To a uniform sample of lard was added 3% of salted olive paste containing 21% total moisture. In sample A, the olive paste was thoroughly admixed in the lard at 175° F. for 10 minutes and then filtered to remove the undissolved portion. In sample B, the olive paste was thoroughly admixed in the lard at 400° F. for 10 minutes and then filtered to remove the undissolved portion. Both samples were then tested for stability at 208° F. with air bubbled through the samples until rancidity was observed, the greater number of hours indicating greater stability.

|  | Stability, hours |
|---|---|
| Control lard | 3 |
| Lard A | 11 |
| Lard B | 28 |

It has furthermore surprisingly been found that where the olive is expressed to remove the major portion of the olive oil contained therein and that olive oil then merely mixed in a deodorized cottonseed oil, for example, using a comparatively large proportion of the olive oil such as 35% of the olive oil and 65% of the deodorized cottonseed oil, the flavor and odor characteristics of that mixture are by no means comparable to the results obtained by admixing a comparatively small proportion as, for example, 10% of the dehydrated olive paste with the deodorized cottonseed oil and with the undissolved solids filtered therefrom. The latter infused cottonseed oil will be a substantially superior product from the standpoint of odor, flavor and antioxidant properties in comparison with the former mixture of the olive oil and the cottonseed oil.

The olive cake remaining after the expression of the olive in the production of olive oil may less desirably be utilized for drying, grinding, macerating, and infusing in the aforesaid manner in a glyceride oil to develop desirable characteristics therein, but the most desirable characteristics are obtained by the use of the unexpressed olive.

Where the whole olive is salted or brined, the salt appears to enhance the desirable flavor and odor characteristics of the glyceride oil with which the salted, dehydrated, macerated olive is infused, although it is normally to be expected that the salt as an oil insoluble material would have no effect.

Having described my invention, what I claim is:

1. A refined cottonseed oil, having novel flavor and odor characteristics and improved stability, containing a small amount of the glyceride oil soluble constituents derived from a salted, low moisture containing, macerated olive paste, the oil being substantially free of the fibers of said olive paste.

2. A refined corn oil, having novel flavor and odor characteristics and improved stability, containing a small amount of the glyceride oil soluble constituents derived from a salted, low moisture containing, macerated olive paste, the oil being substantially free of the fibers of said olive paste.

3. The method of treating a refined glyceride oil to give it novel flavor and odor characteristics and improved stability, which comprises dispersing a small amount of a salted, dehydrated, macerated olive paste in the oil, and then removing the olive paste solids therefrom.

4. The method of treating a glyceride oil to give it novel flavor and odor characteristics and improved stability, which comprises forming a salted, dehydrated olive paste, mixing a small quantity of said paste with a glyceride oil, finely dispersing said paste in the glyceride oil, and then removing the undissolved solids.

5. A glyceride oil composition, having novel flavor and odor characteristics and improved stability, containing a small amount of the glyceride oil soluble constituents derived from dehydrated, salted, low moisture containing, macerated olives, the oil being substantially free of the fibers of said macerated olives.

6. The method of treating a glyceride oil to give it novel flavor and odor characteristics and improved stability, which comprises finely macerating a relatively small amount of salted, dehydrated olives with the glyceride oil, and then removing the undissolved olive solids therefrom.

7. The method of treating a glyceride oil to give it novel flavor and odor characteristics and improved stability, which comprises packing olives with about 50% of their weight of common salt until the moisture content of the olives is reduced to under 30% and until the salt content of the olives reaches over about 5%, removing the pits from said olives, macerating a relatively small amount, less than 20%, of the olives with a glyceride oil, and then removing the undissolved olive solids therefrom.

SIDNEY MUSHER.